Sept. 30, 1969      E. M. GLAROS      3,469,873

JOINT WITH PLANAR CONNECTOR MEMBER

Filed Aug. 15, 1966      3 Sheets-Sheet 1

INVENTOR
EMANUEL MICHAEL GLAROS

Sept. 30, 1969   E. M. GLAROS   3,469,873
JOINT WITH PLANAR CONNECTOR MEMBER
Filed Aug. 15, 1966   3 Sheets-Sheet 2

INVENTOR
EMANUEL MICHAEL GLAROS his attorneys

Sept. 30, 1969  E. M. GLAROS  3,469,873
JOINT WITH PLANAR CONNECTOR MEMBER
Filed Aug. 15, 1966  3 Sheets-Sheet 3
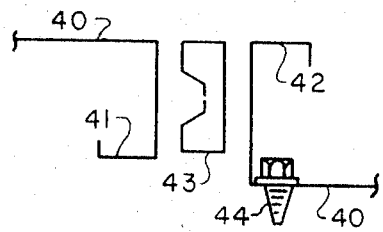
FIG.—25
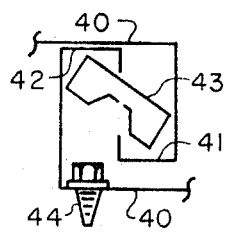
FIG.—26
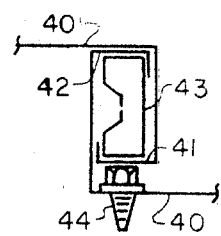
FIG.—27
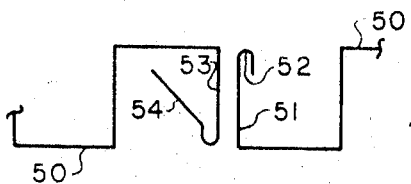
FIG.—28
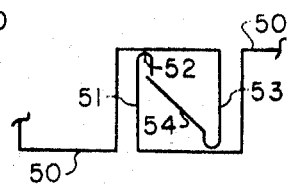
FIG.—29
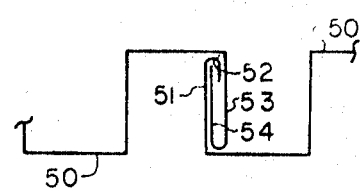
FIG.—30
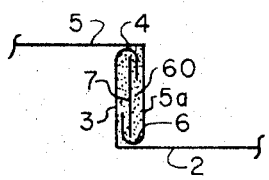
FIG.—31
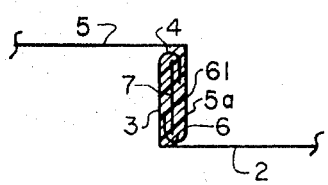
FIG.—32
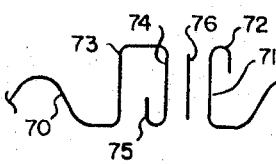
FIG.—33
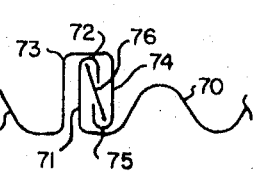
FIG.—34
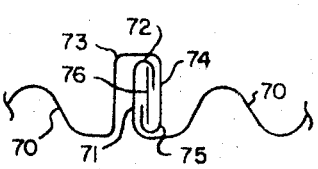
FIG.—35
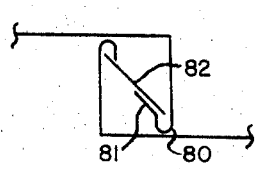
FIG.—36
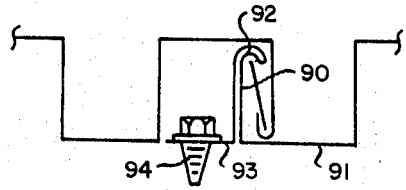
FIG.—37
INVENTOR
EMANUEL MICHAEL GLAROS
his attorneys United States Patent Office 3,469,873
Patented Sept. 30, 1969

3,469,873
JOINT WITH PLANAR CONNECTOR MEMBER
Emanuel Michael Glaros, 240 Cascade Road,
Pittsburgh, Pa. 15221
Filed Aug. 15, 1966, Ser. No. 572,385
Int. Cl. F16b *1/00, 5/00, 7/00*
U.S. Cl. 287—189.36          2 Claims

ABSTRACT OF THE DISCLOSURE

A sheet metal joint connecting adjacent panels made up of a downwardly opening groove at the edge of one panel and an upwardly opening groove at the edge of the adjacent panel, said panel edges overlying one another to enclose said grooves, said grooves facing each other and a generally flat planar member extending between the bottoms of the two grooves in contact with each and held in said grooves by the side thereof.

---

This invention relates to joints and particularly to joints between two adjacent sheets. The need rapidly to join two adjacent sheets along one edge in a manner such that there is provided a weather-tight, non-separable and yet removable seal is a long recognized need, most especially in the field of roofing and siding structures.

I shall describe my invention particularly in connection with roofing and siding structures, however, it is to be clearly understood that the joint of my invention is applicable to a joint between adjacent sheets where a weather-tight, non-separable self supporting joint is required. In the roofing and siding art it is common to use an overlap between adjacent sheets of roofing or siding to provide a weather seal. This overlap is usually in the form of two raised members, one on each sheet, lying one on top of the other to provide a generally vertical path from the general plane of the sheet to the top of the joint and thereby discouraging the entrance of water through the joint. One of the problems with such joints is that if pressure, such as by a person walking a roof made of such sheets, is applied adjacent the joint the joint opens and frequently the sheet deforms to such extent that the joint is no longer weather-tight but is permanently opened. Such sheets have in the past taken many forms, as for example, corrugated, V-groove, alternate squared ridges, ribbed, etc. Also such sheets have been made of various materials such as metals e.g., steel, aluminum, copper alloys, plastic, fiberglass impregnated with plastic and the like and have been made by various methods, e.g., stamping, rolling, extruding etc.

I have invented a joint applicable to connecting sheets of material of any composition and formed in any method. My invention completely eliminates the problem of joint separation common to prior art sheet joints. It is simple in configuration, easy to install and remove and weather-tight to a degree heretofore unattainable in prior art joints.

I preferably provide in combination a pair of sheets to be joined along one edge of each, an upstanding flange on one edge of a sheet to be joined said flange having its free end turned down toward the body of the sheet to form a U-shaped recess, an elongated pocket along the edge of the adjacent sheet adapted to lie over said upstanding flange, said pocket having a downturned flange generally parallel to the upstanding flange of said adjacent sheet, said downturned flange having its free end turned upwardly toward the interior of the pocket to form a U-shaped recess similar to that on the downturned flange and a generally flat locking member adapted to be within the two U-shaped recesses. Preferably the locking member extends the full length of the sheets being joined and bears against the bottoms of both recesses. The area within the two recesses around the locking member may be filled with expanded plastic foam, such as urethane, expanded in situ to form an insulated as well as weather-tight seal.

In the foregoing general statement of my invention I have set out certain objects, advantages and purposes of my invention. Other objects, advantages and purposes of the invention will be apparent from a consideration of the following description and the accompanying drawings in which:

FIGURES 25–27 are sections similar to FIGURES 1–3 illustrating the invention embodied in a third embodiment of square rib panel;

FIGURES 28–30 are sections similar to FIGURES 1–3 illustrating the invention embodying a second embodiment of joining member;

FIGURE 31 shows an assembled joint of the form illustrated in FIGURE 3 with a sealant filler;

FIGURE 32 shows an assembled joint of the form illustrated in FIGURE 3 with a junction sealer;

FIGURES 33–35 are sections through corrugated panels illustrating still another embodiment of my invention;

FIGURE 36 is a section through a further embodiment of joint according to the invention;

FIGURE 37 is a section through a square rib panel joint adapted to take a fastener.

Figure 1:
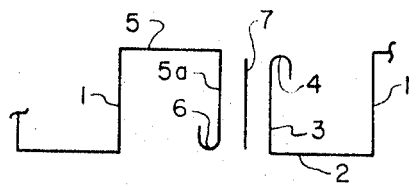
FIGURE 1 is a fragmentary exploded section of two adjacent square ribbed metal panels and a joining member according to my invention.

Referring to the drawing I have illustrated a square rib panel joint according to my invention. In this embodiment the panel 1 is provided with spaced square ribs 2 intermediate its edges. One edge of each panel is provided with a rib leg 3 having the end turned toward the panel and downwardly to form a U-shaped groove 4. The other edge of said panel is provided with a rib 5 having the end of the outside leg 5a turned back toward the plate and upwardly to form a U-groove 6. A flat elongated locking member 7 is inserted into grooves 4 and 6 and the side by side panels moved relatively to one another to force the lock member 7 to seat in each of said grooves generally parallel to rib member 3 and 5a. In this position the lock member 7 acts as a supporting beam to hold the two edges in fixed relation both vertically and horizontally.

Figure 3:
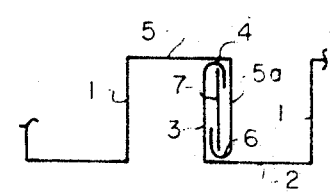
FIGURE 3 is a fragmentary section of the panels of FIGURE 1 in the completely assembled position.
Figure 4:
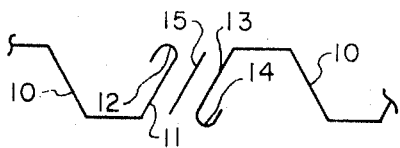
FIGURES 4–6 are sections similar to FIGURES 1–3 illustrating the invention embodied in V-beam panels.
Figure 5:
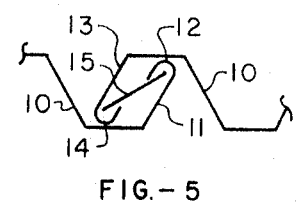
Figure 6:
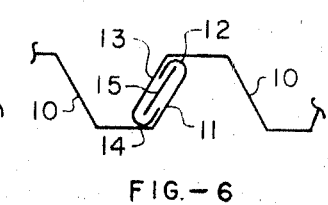

In FIGURES 4 through 6 I have illustrated the invention incorporated in a V-beam panel in which one edge of each panel 10 has an upstanding leg 11 with the end turned over to form a groove or pocket 12 and the opposite edge has a downturned leg 13 with the end turned over to form a groove or pocket 14. A flat bar 15 is inserted in the grooves as the case of bar 7 of FIGURES 1–3.

Figure 7:
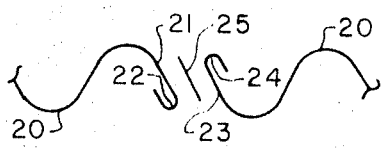
FIGURES 7–9 are sections similar to FIGURES 1–3 illustrating the invention embodied in corrugated panels.
Figure 8:
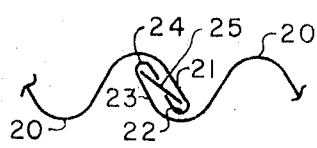
Figure 9:
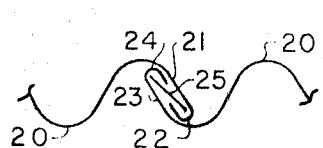
Figure 10:
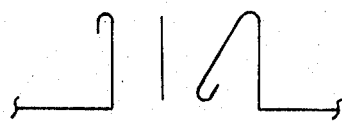
FIGURES 10–12 are sections similar to FIGURES 1–3 illustrating the invention embodied in flat panels.
Figure 11:
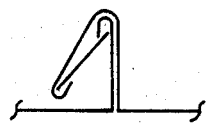
Figure 12:
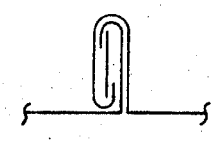
Figure 13:
FIGURES 13–15 are sections similar to FIGURES 1–3 illustrating the invention embodied in a second embodiment of flat panels.
Figure 14:
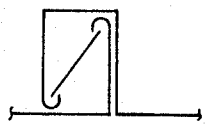
Figure 15:
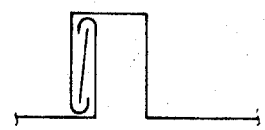
Figure 16:
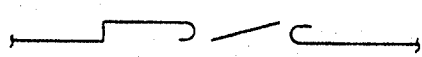
FIGURES 16–18 are sections similar to FIGURES 1–3 illustrating the invention embodied in a third embodiment of flat panels.
Figure 17:
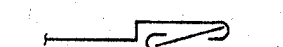
Figure 18:
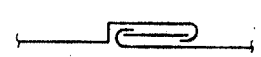

In FIGURES 7 through 9 I have illustrated a corrugated panel 20, one edge 21 is turned over to form a pocket 22. The opposite edge 23 is similarly turned over to form a pocket 24. A flat bar 25 is inserted into the two pockets 22 and 24 and the adjacent edges moved relatively to one another to force bar 25 into pockets 22 and 24.

In FIGURES 10 through 18 I have illustrated various embodiments of my invention in a flat panel. The operation is believed to be obvious from the drawings.

Figure 2:
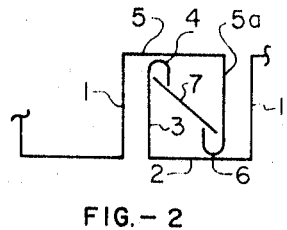
FIGURE 2 is a fragmentary section of the panels of FIGURE 1 in the intermediate assembly step according to my invention.
Figure 19:
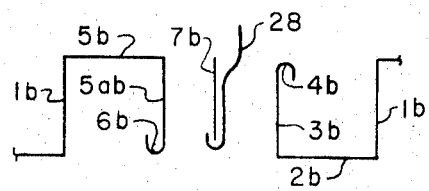
FIGURES 19–21 are sections similar to FIGURES 1–3 illustrating the invention embodied in a square rib panel using a tape holder.
Figure 20:
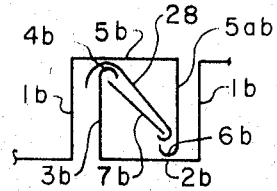
Figure 21:
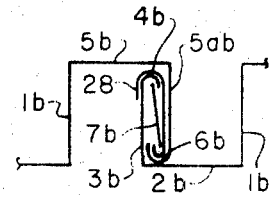

In FIGURES 19 through 21 I have illustrated a form of my invention identical with that of FIGURES 1 through 3 and like numerals with the suffix b had been used for like parts. In this embodiment the flat bar 7b is attached to one leg 3b by means of a pressure sensitive tape 28 which acts as a sound damper and seal as well as a temporary holder for the bar.

Figure 22:
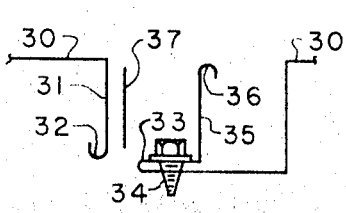
FIGURES 22–24 are sections similar to FIGURES 1–3 illustrating the invention embodied in a second embodiment of square rib panel.
Figure 23:
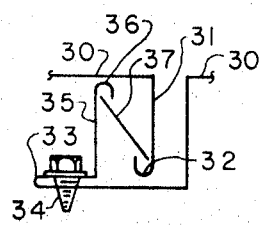
Figure 24:
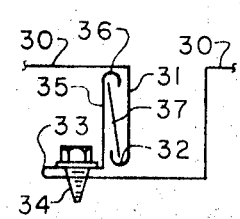

In FIGURES 22 through 24 I have illustrated another embodiment of square rib panel in which a panel 30 is provided at one edge with a rib leg 31 having the end turned back upon itself to form a groove 32. The other edge of each panel is turned back upon itself to form a fastening flange 33 adapted to take a fastener 34. The said other edge is then turned up to form a leg 35 of a rib and bent back on itself to form a groove 36. A flat bar 37 is inserted in grooves 36 and 32 as in the embodiment of FIGURES 1–3 and the panel which has not been fastened is moved sidewise to force the bar 37 into the vertical position shown in FIGURE 24.

FIGURES 25 through 27 show still another form of square rib panel 40 in which the panel edges are bent to form channels 41 and 42 into which is inserted a resilient formed beam 43. A fastener 44 may be inserted through the panel 40 to lie beneath the joint. Again the joint is assembled by moving a panel sidewise relatively to the adjacent panel to force the beam 43 into channels 41 and 42.

In FIGURES 28 through 30 I have illustrated a form of square rib panel 50 in which one edge is provided with a rib leg 51 having a downturned edge forming a channel 52. The other edge is provided with a mating rib leg 53 which is turned back upon itself to form an upstanding flange 54. The flange 54 is inserted in groove 52 and the panels moved sidewise to force the flange 54 into the vertical position (See FIGURES 29 and 30) in which position it acts in the same fashion as bar 7 of FIGURES 1–3.

In FIGURE 31 I have shown a joint such as that of FIGURE 3 (all identical parts bearing numbers identical with FIGURE 3) into which has been fed an epoxy sealing material 60.

In FIGURE 32 I have shown a joint identical with that of FIGURE 31 (all identical parts bearing numbers identical with FIGURE 3) having a plastic sealant 61 inserted in grooves 4 and 6.

In FIGURES 33, 34 and 35 I have illustrated a second embodiment of corrugated panels having side by side corrugations 70. One side is provided with an upstanding rib 71 having the edge turned over to form a U-groove 72. The opposite side is provided with an upstanding square rib 73 with an outside leg 74 which extends over adjacent rib 71. The end of leg 74 is turned in and upward to form a U-groove 75 facing groove 72. A flat bar 76 is inserted in grooves 72 and 75 as in FIGURES 1–3.

In FIGURE 36 I have illustrated a form of U-groove 80 having a tongue 81 which may be solid or toothed and which aids in holding bar 82 during the step of assembling adjacent panels.

In FIGURE 37 I have illustrated another form of joint similar to that of FIGURES 1–3 in which upstanding rib 90 along one edge of panel 91 is bent to form a U-groove 92 and then bent back upon itself and parallel to the rib back to the plane of panel 91 and then outwardly in the plane of panel 91 to form a fastener rib 93 through which fastener 94 may be inserted to hold the panel to a roof joist or the like.

In the foregoing described joints it will be apparent that each joint is made up of a groove, channel, recess or its equivalent along each edge and a bar or beam, either as a single long unit or as a plurality of small bars or beams inserted in the grooves and moved into position parallel to the two connecting portions of the panel to form a strengthening and fastening member. In each case the grooves are formed so that in order for the bar to go into place either the edges of the grooves or the bar or beam or both bend and spring into position so that when assembled the joint is tight and will not separate.

I claim:

1. A joint between adjacent panels comprising a downwardly opening groove at the edge of one panel, an upwardly opening groove at the edge of the adjacent panel, said panel edges overlying one another to enclose said grooves, said grooves facing each other and a generally flat planar member extending between the bottoms of the two grooves in contact with each and held in said grooves by the sides thereof, said panels being square ribbed and one edge of one panel provided with an upstanding leg having the end turned downwardly to form the U-groove and the other panel provided at the edge with a square rib having a downwardly extending leg with an upturned edge forming the U-groove, said grooves facing each other and receiving the flat member in contact with each.

2. A joint between adjacent panels comprising a downwardly opening groove at the edge of one panel, an upwardly opening groove at the edge of the adjacent panel, said panel edges overlying one another to enclose said grooves, said grooves facing each other and a generally flat planar member extending between the bottoms of the two grooves in contact with each and held in said grooves by the sides thereof, said panels being corrugated, one edge of one panel turned up at the angle of the corrugations and bent over to form a generally downwardly opening U-groove and the adjacent edge of the other panel having a corrugation lying over said edge of the other panel and having the edge turned up to form an upward opening U-groove, said grooves receiving the flat member in contact with each.

References Cited

UNITED STATES PATENTS

| | | | |
|---|---|---|---|
| 2,066,718 | 1/1937 | Dietz | 52—588 |
| 2,180,504 | 11/1939 | Bradfield et al. | 52—588 |
| 2,576,296 | 11/1951 | Green. | |
| 2,644,553 | 7/1953 | Cushman. | |
| 2,918,996 | 12/1959 | Brown. | |
| 3,118,252 | 1/1964 | Weed et al. | |
| 3,119,473 | 1/1964 | Mitchell. | |
| 3,151,767 | 10/1964 | Nakata. | |
| 3,319,543 | 5/1967 | Braeuninger et al. | 52—588 |

FOREIGN PATENTS 850,642  10/1960  Great Britain.

MARION PARSONS, Jr., Primary Examiner

U.S. Cl. X.R.

52—127, 394, 521, 530, 586, 588